INVENTOR.
JAMES D. COLE
BY
Albert R. Golrick
Attorney

July 19, 1955 J. D. COLE 2,713,455
ELECTRIC MOTOR-FAN UNIT
Filed July 21, 1953 3 Sheets-Sheet 2

INVENTOR.
JAMES D. COLE
BY
Albert R. Golrick
Attorney

July 19, 1955  J. D. COLE  2,713,455
ELECTRIC MOTOR-FAN UNIT
Filed July 21, 1953  3 Sheets-Sheet 3

INVENTOR.
JAMES D. COLE
BY Albert R. Golrick
Attorney

United States Patent Office 2,713,455
Patented July 19, 1955

2,713,455

ELECTRIC MOTOR-FAN UNIT

James D. Cole, Kent, Ohio, assignor to The Lamb Electric Company, Kent, Ohio, a corporation of Ohio Application July 21, 1953, Serial No. 369,369

18 Claims. (Cl. 230—117)

The present invention relates to improvements in electric motor driven fan units, particularly to motor fan units for use in electric vacuum cleaners.

In electric motor driven fan units such as those used in vacuum cleaners, particularly tank type vacuum cleaners, by reason of the environment of use, compact structures of high air and vacuum capacity are required, and simplicity of structure adapted to low cost mass production methods and to uniformity of performance are, of course, highly desirable.

The present invention provides a motor-fan unit wherein the motor frame comprises a stator core and two motor frame end members seated on and against the stator core and held by clamping bolts, one of the frame members being an integral structure providing a corresponding rotor shaft bearing support, a radially extended end baffle plate for an adjacent fan chamber, air guide vanes directing the air for efficient motor cooling, a base for supporting fan housing and air guide members and for mounting the entire motor fan unit into environment of intended use. The structure disclosed herein for this multi-functional motor frame end member permits a simplified compact structure for the unit as a whole, and further is adapted for manufacture by die castng methods and for ready mounting and machining of the die casting as required.

The other end member for a commutator type motor is adapted as an element of the motor frame described for a simple rotational adjustment simultaneously of the position of both brushes for adjusting the motor, and hence the fan, to specified fan operation tolerances; and also for ready incorporation of the brush holder unit disclosed, with brush elements assembled therein, into a fixed correct position relative to the brush supporting frame member. The disclosed brush holder unit itself with the mounting structure therefor, is an invention of M. H. Spielman, application Serial No. 369,362.

The structure and relation of the motor-fan unit elements are such that the air is directed from the fan both exteriorly and interiorly of the stator core for cooling the rotor, stator, shaft bearings, and where used commutating elements, so that a motor of more compact size may be operated at higher power ratings than would otherwise be possible.

An object of the present invention is to provide an efficient compact motor-fan unit comprised of a minimum number of elements.

Another object is the provision of a compact motor-fan unit, wherein supporting means for the entire unit serves as a motor frame end member incorporating a motor bearing support, a fan chamber end baffle plate and air guiding vanes.

Another object is the provision of a motor frame adapted for simple rotational adjustment of both motor brushes by a single adjustment operation.

A still further object is the provision of a motor frame structure having a frame end member carrying brush holder units such that the brushes may be assembled readily into a fixed correct position relative to that frame member and each other, while permitting simple simultaneous adjustment of both brushes relative to the field core of the motor.

Other objects and advantages of the invention will appear from the following description and drawings wherein.

Figure 1:
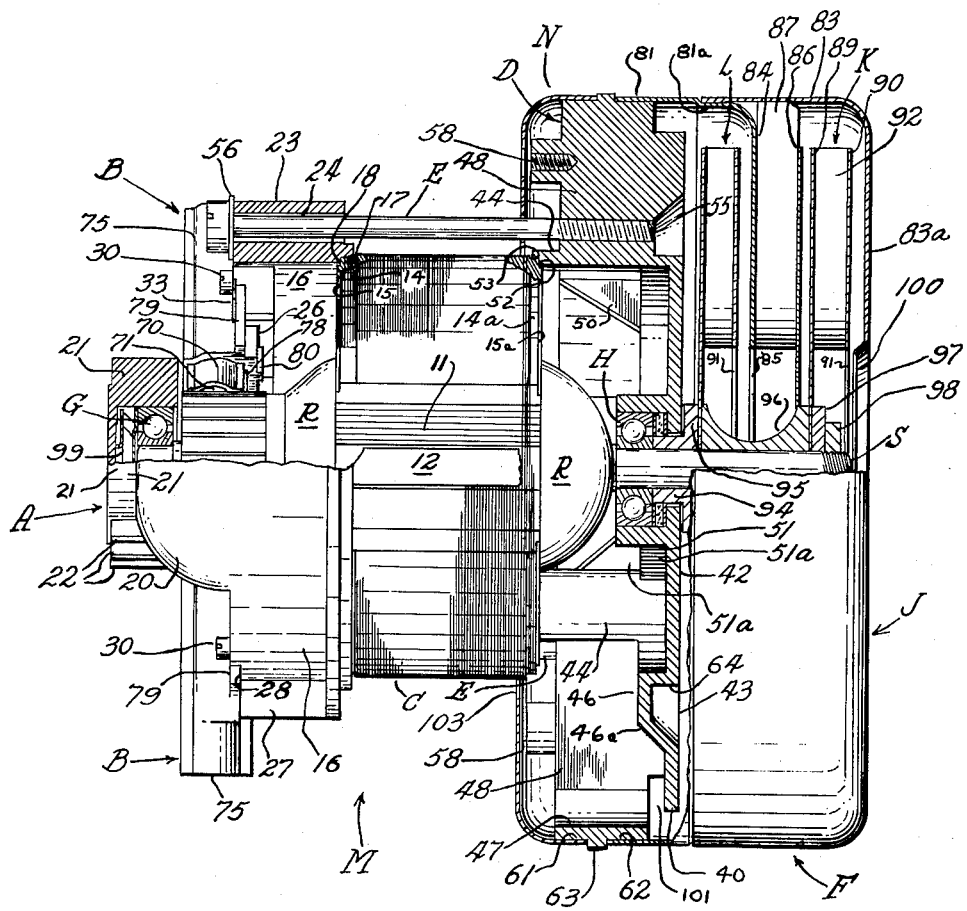
Fig. 1 is a side view of the motor and fan unit with parts of the brush mounting frame end member and of the fan housing broken away to show the structure as partial axial sections substantially on the line 1—1 in Fig. 2.
Figure 2:
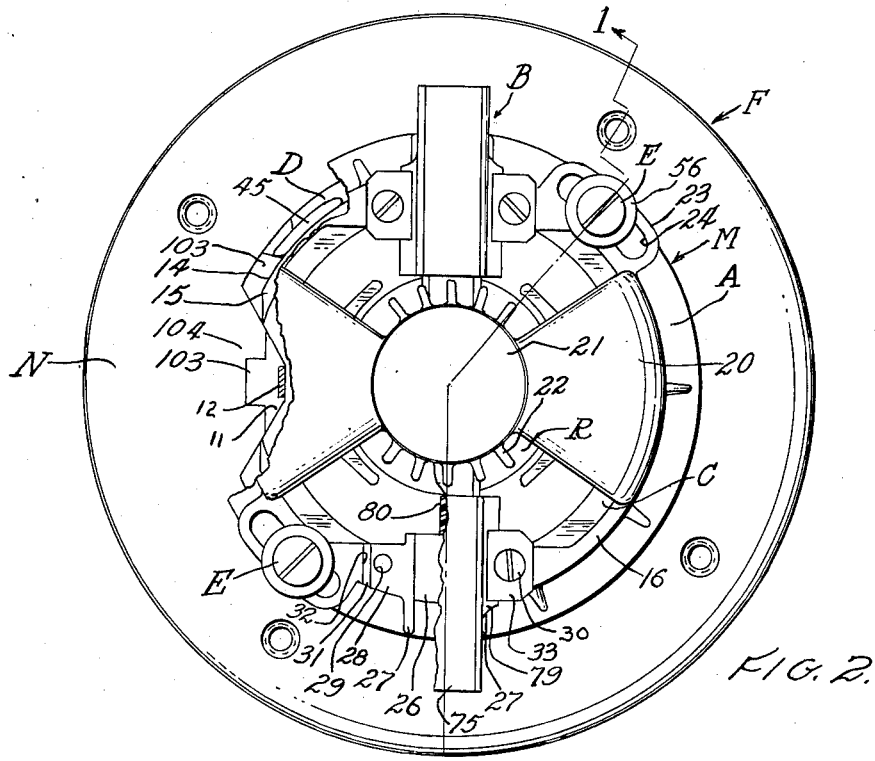
Fig. 2 is a view of the motor end of the unit showing the brush holding motor end frame member and attached elements, some parts being broken away to reveal details thereof.

The electric motor and fan unit of this invention shown in the drawings, wherein the motor and fan assemblies are designated by the general reference characters M and F respectively, comprises as principal elements the stator or field core C; the armature or rotor on the shaft S of which ball bearing units G and H are press-fitted into position against shoulders on the shaft; the motor frame end members A and D held on opposite ends of the field core C by frame clamping bolts E, wherein the motor shaft S is journalled by bearings G and H; brush holder units B on frame member A; cylindrical fan housing J carried on end member D providing two fan chambers for centrifugal fans K and L secured in spaced relation on shaft S; and a cylindrical cap member N, which may be considered part of the fan assembly, which aids in directing the exhaust air stream from the fan through and about the motor.

Figures 5, 6:
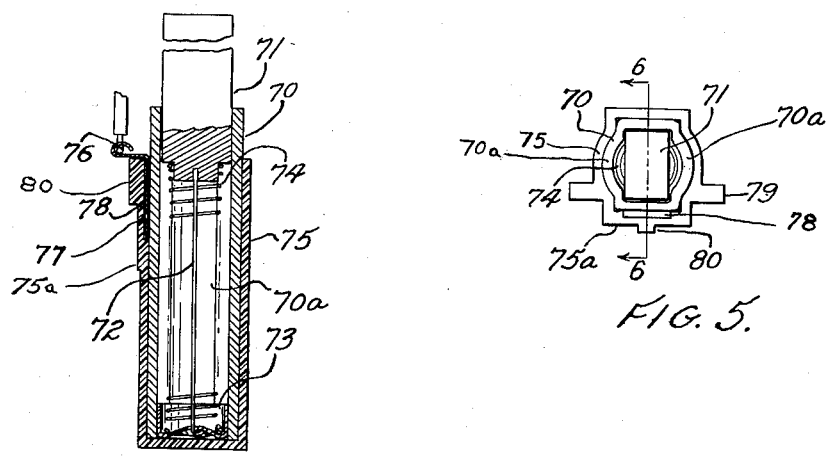
Fig. 5 is a detail view of the brush holder unit taken from the brush end.
Fig. 6 is a detail longitudinal sectional view taken along the line 6—6 in Fig. 5.

The stator structure which may be that described in U. S. Patent No. 2,631,251, issued March 10, 1953, is here shown as having a two pole deep coil slot laminated core C of generally cylindrical shape but with exterior surface interrupted by longitudinally directed, flat-bottomed, trough shaped grooves 11 to receive the insulated metal strips or clips 12 holding the field coil ends in place. After the laminae have been riveted together in fabricating the core, the cylindrical surfaces 14, 14a and end surfaces 15, 15a are machined on the end edges to provide effective core diameter and core length whereby the end members A and D may be fitted onto the core and maintained in proper relation. For clarity in showing the structure of frame and brush holder elements, the stator windings are omitted from the slots, and, except in Fig. 6, the brush leads are not shown as these are conventional.

The frame member A and also D as shown in the drawing are adapted to die casting production with a minimum of machining required thereafter. The member A comprises an annular body portion 16 with inner rim rabbeted to provide an inner peripheral surface 17 and end face surface 18 closely fitting the corresponding surfaces 14 and 15 on the field core but permitting manual rotation of A; an outwardly bowed diametrically disposed bridge or spider portion 20 across the annular body including at the center thereof a bearing socket structure 21, internally machined concentrically with surface 17 to receive bearing G in sliding fit, and having external integral bearing cooling fins 22; diametrically disposed lug formations 23 projecting externally from the annular body portion and arcuately slotted at 24 to receive the motor frame bolts E; and diametrically disposed radially directed brush holder seating slots 26 formed in the outer end faces of the sectorially thickened walls of the annular body 16 with the slot walls extended outwardly by rib formations 27. At the sides of each brush holder slot, the adjacent flat surfaces 28 are provided with threaded apertures 29 spaced from the slot for receiving brush clamping screws 30, and outwardly of each aperture a double shoulder providing edge supporting and edge locating surfaces 31 and 32 for the perforated spring metal brush holder clips or clamping plates 33, which immediately engage longitudinal fins 79 on opposite sides of each holder to clamp them against surface 28. The holder clamp plates 33, approximately rectangular in shape and somewhat longer than the radial extent of the surface 31, are preformed to downwardly concave shape with ends more sharply turned to permit the end edges thereof to dig into the brush holder fins and provide mechanical as well as frictional clamping purchase thereon. The brush seat slots 26 may be cast slightly narrow and finished to proper width by a light broaching cut.

Figure 4:
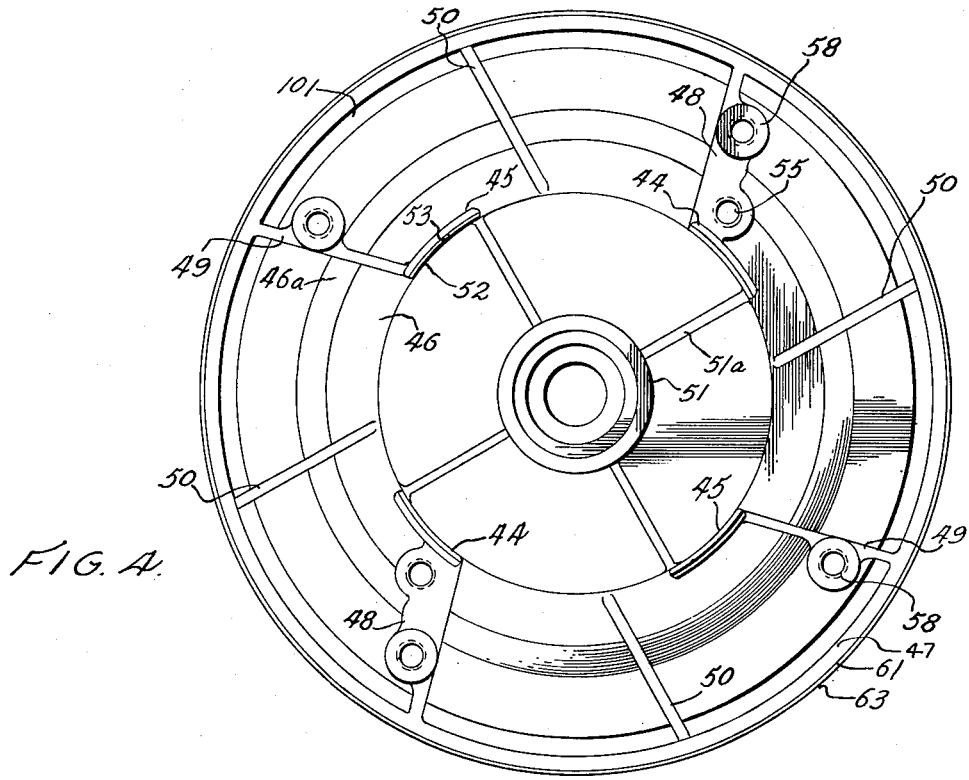
Fig. 4 is an end view of the motor side of the motor end frame member.
Figure 3:
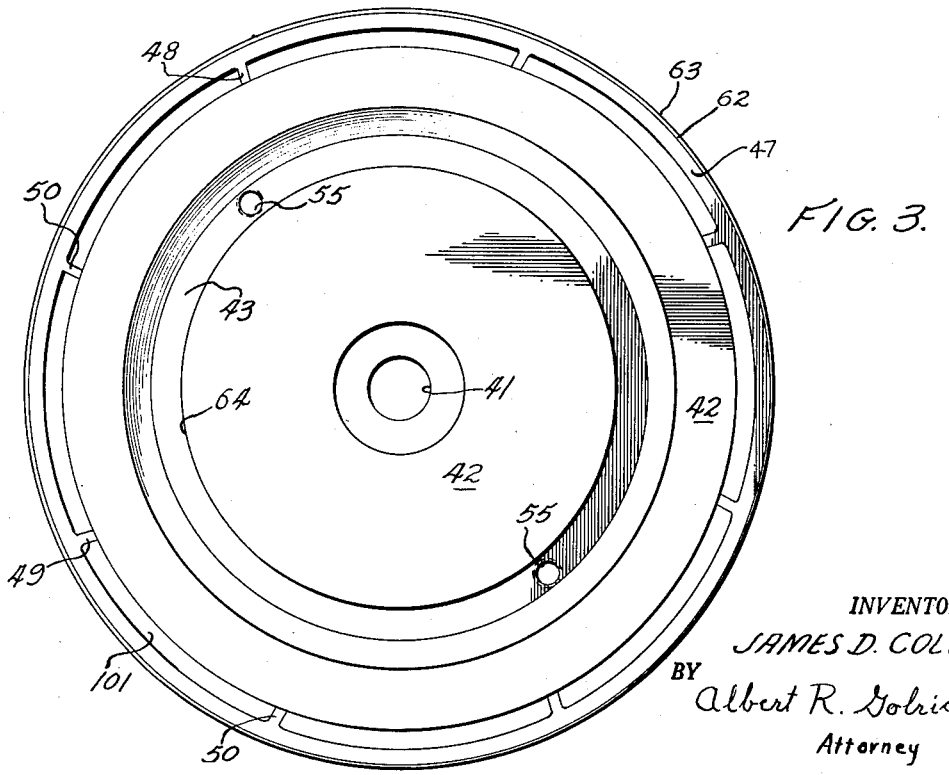
Fig. 3 is a detail view of the fan side of the motor end frame member.

The end member D in the fan end of the motor frame, serving as an element of both motor and fan assemblies, which may be seen in detail in Figs. 3 and 4, comprises as an integral structure a disk 40 centrally apertured at 41 and relieved to receive and clear sleeve 94 on motor shaft S, in the face 42 of which—called the front face for convenience of reference for other elements—there is formed the circular groove 43; four equispaced diametrically paired arcuate posts 44, 45 extending rearwardly from the annular projection 46 corresponding to groove 43; a cylindrical rim portion 47 supported in rearwardly and circumferentially spaced relation to the outer edge of disk 40 by ribs 48, 49 extending out from corresponding edges of posts 44, 45 and by triangular ribs 50; and a rearwardly extending cylinder 51 providing a bearing socket machined to receive bearing H, from which spaced re-enforcing ribs 51a on the back of disk 40 extend radially to those sides of each of the posts 44, 45 opposite the location of ribs 48, 49.

The ends of posts 44, 45 are rabbeted to provide machined coplanar end and concentric arcuate side surfaces 52, 53 for receiving the end and cylindrical surfaces 14a, 15a of the field core C, while the ribs 48 outward of posts 44 are threaded at 55 to receive the frame clamping bolts E. The ribs 48, 49 also have bored and threaded stud projections formed at 58 to receive and engage bolts passed through corresponding apertures 58a in cap member N for mounting the entire unit as desired in a surrounding structure. Thus the motor frame is constituted of the field core C itself, the brush-end and fan-end frame members A and D, and the clamping bolts E extended through washers 56 and brush adjustment slots 24 in member A and threaded into end member D. The slot arrangement and the relation of corresponding machined surfaces on member A and on the field core C permit simultaneous setting of the brushes relative to the field core for adjustment of motor speed output and thus the fan efficiency by merely loosening bolts E and rotating end member A. The rim 47 is formed with cylindrical surfaces 61, 62 separated by a circumferential rib 63 on which the shallow cylindrical cap member N and cylindrical fan housing J are mounted. The cylindrical surface 64 of groove 43 provides a surface for chucking the member D during machining of the outer edge of disk 40, the cylindrical surface 62, front edge of rim 47 and the intervening portions of the several rib edges, while the finished surface 62 may then serve for chucking the member D in boring bearing socket 51 to final size and in turning the cylindric surface 61 on rim 47. This is of particular advantage since the groove 43 may be formed integrally in the die casting of the end member, therefore facilitating the machining of the several concentrically disposed surfaces thereon.

The brush holder units B, as may be seen in Figs. 1, 2, 5, and 6, each comprise an extruded metal brush tube 70; a brush element 71, preferably pre-shaped to the commutator, the brush being of rectangular cross section and connected at its outer end by a flexible conductor 72 to an anchor element 73; a brush compression spring 74, through which conductor 72 extends, interposed between the brush and anchor element to urge the brush into contact with the commutator; an insulating tube 75 adapted in cross section to receive the tube 70 in close slip fit, and a brush lead connecting clip 76 soldered to the brush lead, which is pressed endwise between insulating and metal tubes. The body of clip 76 is slightly bowed lengthwise and nibbed outwardly of the convex surface at 77 to provide a barb which bites into the insulating tube to prevent loosening and displacement of the elements. A slight recess 78 in the bottom wall of the insulating tube 75 provides space for the insertion of the clip member and a shoulder at the end of the recess limits the insertion thereof. The insulating tube 75 is preferably formed or molded of a plastic such as nylon, with closed outer end and longitudinally extended lateral clamping fins 79. The fins 79 are spaced upwardly from the bottom side of the insulating tube a distance corresponding to the depth of the brush holder slot for clamping between clips 33 and surfaces 28, while permitting the holder body to bottom in the slot.

A central lug 80 at the inner end of the bottom brush wall provides a gauging shoulder bearing outwardly against the inner edge of the seat slot 26 for locating the brush assembly radially in the slot.

Tube 70 is modified from the rectangular cross section corresponding to the brush cross section by the curved portions 70a in the long sides of the section which accommodate and maintain the brush spring 74 in cylindrical disposition while yet providing means maintaining the brush against rotation relative to the commutator. To aid in maintaining the spring position, and to receive solder securing conductor 72, the face of the anchor member is dished concavely inwardly toward the spring, forming a slight projection centering one end of the spring, while the end of the brush is turned down to fit in the other end. The flexible conductor or brush pig tail may be held in an end bore of the brush by a solder plug and at the other by soldering to the anchor element. The anchor member itself may be cup shaped as shown and pressed into the outer end of the brush tube between the curved wall portions 70a or may be a disk set into a slight counterbore in tube 70 with the edges of the bore peened over to hold the disk edge. In either form, the anchor member is centrally apertured so that in assembling the brush with attached conductor, the brush spring and anchor into a unit, the conductor is simply threaded through the spring and through the anchor aperture to required length and soldered in the concavity in the outer face of the anchor. The resulting unit is slid into the tube 70, the anchor is seated in the tube end, either by pressing or peening, and the tube 70 is slid into the insulator tube 75. The travel of the brush is limited by the conductor length so that the brush is retained within the tube in all subsequent operations. For final assembly of the brush holder into the motor frame, the lead clip 76, already soldered to a brush lead, is pressed inwardly between the insulating tube 75 and conductor tube 70 to wedge and block the elements together. The holder unit is then seated in the holder slot, wherein it is held, despite inward displacement of the brush by the commutator and consequent compression of the spring, by lug 80 engaging the inner end of the slot. Thus the clips 33 and screws 30 may be applied without manually holding or jigging the holders and frame end A.

In the two stage fan unit, the housing J comprises the cup-shaped drawn sheet metal member 81 press fitted on the cylindrical surface 62 of rim 47 and necked down at 81a to receive the second similar member 83 press fitted thereon, the radial portion 84 of member 81 forming a partition centrally apertured at 85, to the forward face of which a baffle disk plate 86 is mounted in spaced relation by the air stream directing vanes 87 extending outwardly from the aperture 85 to the side wall of 83. Each vane 87 is disposed obliquely to the radial direction with its inner end advanced in the direction of fan rotation. The vanes 87 may be straight sheet metal strips secured by welding, brazing, riveting or other means between 84 and 86.

The shallow cylindrical cap member N pressed onto surface 61 of rim 47, with a large central opening 103 through which the end of the field core extends in circumferentially spaced relation, forms a chamber receiving the exhaust air stream from the fans. The tongue 104 projecting inwardly from the periphery of central opening 103 is formed with slanting sides corresponding in angular disposition to the sides 11 of the trough groove 11 of the core C, providing registering means whereby the field core is directed into standard position relative to the base plate 40 during assembly and further is maintained in such position when the clamping bolts E are loosened and the frame end member A is rotated for brush adjustment.

The fan elements K and L are similar, each comprising a disk 89 centrally apertured for shaft S, an annular disk 90 with a large central air intake opening 91, and a plurality of vanes 92 curving outwardly away from the direction of rotation from the intake opening to the periphery of the disks. Sleeve 94 bearing endwise against the inner race of bearing H and having a radial fan clamping flange 95, the spool-shaped fan spacer sleeve 96, and end washer 97 against which bears the nut 98 on the threaded end of shaft S, serve to clamp the fan members K and L in spaced axial position on the shaft and respectively in the fan chambers formed between the radial end wall 83a and fixed baffle disk 86 and between partitions 84 and end baffle plate 40. The spider compression spring 99 interposed between the end wall of bearing socket 21 and the outer race of bearing G biases the rotor with attached fans to a normal operating position.

For air flow efficiency, the main air inlet 100 of the fan unit housing is formed as a central aperture in 83a with inwardly curved lip directing the air flow into the opening 91 of fan K. It is also to be noted that the air flow in the fan housing is guided by the curved surfaces provided in the portions of the housing members joining the radial and cylindrical parts of the several casing and cap members. The air leaving the first stage fan and passing between the edge of disk 86 and housing 83 into the channels provided by guide vanes 87 is guided inwardly to the central opening of the second stage fan L by the circumferential groove on the spool member 96 of semi-circular groove cross section whence it is impelled outwardly by the second stage fan to enter through openings 101, peripheral to disk 40 and between the ribs 48, 49, 50, into the chamber formed between the cap member N, the field core C and the plate 40.

The proximity of the end baffle surface 42 to fan L in the environment disclosed materially increases the vacuum produced, and it has been found that the inclusion of groove 43 in the surface is substantially without effect on the result obtained.

The several ribs 48, 49 and 50, disposed obliquely to this radial direction and slanting inwardly in the direction of rotation away from corresponding radii, break up the circular motion of the annular air stream leaving fan L and direct the air between posts 44, 45 toward the rotor. The sloping outer face 46a on the annular projection 46 also serves as an air directing means to direct the air rearwardly toward the rotor and the end of the field core. The escaping air, thus directed by member D longitudinally between rotor and stator core to pass the bearing cooling fins 22 as well as through the central opening 103 of cap member N about the outside of the core, cools the rotor, bearings G and H, and stator structure. The large area of member A exposed to air flow is particularly effective in cooling the bearing H in the integral bearing socket.

The motor-fan unit is readily assembled from the fabricated elements hereinbefore described in the following manner. The cap member N is pressed into place on rim 47 of the frame end member D with the frame and mounting bolt apertures therein aligned with the corresponding threaded apertures in the ribs of member D. End washer means such as a pair of steel washers with interposed felt washer are then dropped into the bearing socket H. The stator structure C is inserted through the opening 103 in cap member N to position the core in the rabbeted surfaces of posts 44 and 45, the tongue 104 locating or registering the stator structure by engagement in trough 11. The armature, with the ball bearings already lightly pressed into place on the shaft, is then inserted with the fan end of the shaft passing through the bearing end washers and the plate 40 of member D. A steel end washer and the loading spring 99 are placed on the end of bearing G and the brush end frame member A is positioned on the end of the stator structure, the bearing with annexed elements being received in the bearing socket 22. The frame bolts E with washers 56 thereon are then inserted through slots 24 on member A and screwed into the threaded apertures 55 in D to clamp the frame together. The end sleeve 94, fan L and spacing spool 96 are placed on the shaft and the fan housing J—already pre-assembled by pressing casing member 83 with fan K therein into position on casing member 81— is then centered relative to rim 47 with the shaft extending through K and pressed into place on the rim. The shaft end washer and nut are then applied to the shaft to clamp the fans axially on the shaft. As the final assembly step, the brush lead clips—already soldered to the leads—are inserted in the brush holders and the brush holders are then placed in the slots and clamped by plates 33 and screw 30.

Alternately, the method of assembly may be varied by pressing housing member 83 with fan K therein onto housing member 81, inserting an assembly arbor axially through the housing and fan K, placing spool 96, fan L and end sleeve 94 successively onto the end of the arbor in the open side of the housing, and then pressing the entire housing assembly onto the rim 47 of the frame member D to which cap member N has already been assembled. The washers for bearing H and the field core structures are then inserted as previously described. When the rotor is set into place, the assembly arbor is withdrawn before, or expelled by the following shaft, leaving the several fan and clamping elements thereon. The remaining assembly steps are then carried out in the manner already described.

The entire unit thus produced after inspection, testing and brush adjustment is ready for assembly into the environment of intended use, for example, the cylindrical casing of a tank type vacuum cleaner.

I claim:

1. An electric motor-fan unit comprising a rotor, a stator core within which the rotor is disposed and having the ends thereof formed to provide end face surfaces perpendicular and external arcuate surface portions co-axial to the axis of the rotor; a first frame end member having an annular body portion including a plurality of spaced radially projecting lugs apertured in a direction parallel to the annular axis, and having an integral bridge portion across said annular body portion, the annular body portion having an internally rabbeted rim providing a cylindrical surface and a circular shoulder surface inward thereof corresponding respectively to the arcuate surface and end face surface portions at one end of the core whereby the said frame end member is fitted to said core, said bridge portion having formed therein an inwardly open rotor shaft bearing socket co-axial with said cylindrical surface; a second end frame member comprising as an integral structure a disk centrally apertured to receive therethrough a rotor shaft and having a bearing socket formation on one face thereof about the disk aperture for receiving a second rotor shaft bearing, a plurality of posts spaced radially between said socket and the edge of said disk, said posts being circularly spaced from each other and extending perpendicularly from the rear side of said disk to said stator core, each post being rabbeted to provide an arcuate surface co-axial to the second said bearing socket and an inner shoulder surface corresponding respectively to the arcuate surface and end face surface portions on the second end of said core whereby the second frame member may be fitted thereto, a plurality of spaced air guide vanes perpendicular to the rear face of said disk extending outward obliquely relative to disk radii beyond the edge of said disk, and a cylindrical rim portion supported by the outer ends of said vanes in co-axial rearwardly spaced relation to said disk to provide air passageways between the rim and periphery of said disk; said rotor having the shaft thereof journalled by bearings in said sockets; frame bolts extending through said lugs exteriorly of said core and threaded into corresponding apertures in said disk for holding said frame members to said core with the said rotor mounted therein; fan impeller means on a rotor shaft end extended through said disk; and a fan unit housing including a first cylindrical member inclosing said fan impeller means having one end fitted about the forward part of said cylindrical rim portion and the other end inwardly flanged to provide a casing end wall having a central air inlet, and a second cylindrical member surrounding the rear side of said second frame member having one end fitted on the rearward part of said rim portion and the other end flanged inward toward and in circumferentially spaced relation to the said stator core to form an air exhaust chamber whereby air from said impeller means is directed to exhaust lengthwise of said core exterior thereto and between said core and said rotor for motor cooling.

2. An electric motor-fan unit as described in claim 1, wherein the outer surface of said bridge portion adjacent said bearing socket therein is provided with integral bearing socket cooling fins.

3. An electric motor-fan unit as described in claim 1, wherein said second frame member is provided rearwardly of the fanward face of said disk with mounting bolt engaging formations whereby said second frame member is adapted to serve as a base of the entire unit in mounting the unit in environment of use.

4. An electric motor-fan unit as described in claim 1 having a commutating rotor and brushes mounted on the first said frame member, and wherein the apertures of said lugs are arcuate slots co-axial with said rabbeted rim, whereby the brush positions relative to the stator core may be simultaneously adjusted by loosening the said frame bolts and rotationally setting the position of said first frame end member.

5. An electric motor-fan unit as described in claim 4, wherein cooperating means are provided on said stator core and carried on said second frame member, whereby rotation of the core relative to the second frame member is prevented during rotational adjustment of the brush position.

6. An electric motor-fan unit as described in claim 1, wherein said rotor shaft bearings are press-fitted onto the rotor shaft and the bearings are slip-fitted in said sockets, and wherein elastic means are provided in the bearing socket of the first frame member for applying an endwise thrust to said rotor for maintaining the impeller means carried by the shaft of said rotor in operating position relative to said housing.

7. An electric motor-fan unit as described in claim 6, wherein said impeller means comprises a spaced pair of centrifugal fan wheels each having a central air intake opening and wherein said first cylindrical member of the housing is provided with a centrally apertured partition between said fan wheels dividing the space between said disk and first cylindrical member into two fan compartments, whereby a two stage fan is provided; and air guide means located between the partition and the periphery of the first stage wheel for directing air therefrom to the central intake opening of the second wheel.

8. An electric motor comprising a rotor; a stator core wherein the rotor is disposed and having the ends thereof formed to provide end face surfaces perpendicular to and external arcuate surface portions co-axial to the common axis of the rotor and core; a first frame end member having an annular body portion including a plurality of spaced radially projecting lugs apertured in a direction parallel to the annular axis, and having an integral bridge portion across said annular body portion, the annular body portion having an internally rabbeted rim providing a cylindrical surface and a circular shoulder surface inward thereof corresponding respectively to the arcuate surface and end face surface portions at one end of the core whereby the said frame end member is fitted to said core, said bridge portion having formed therein a rotor shaft bearing receiving formation co-axial with said cylindrical surface; a second end frame member comprising as an integral structure a disk centrally apertured to receive therethrough a rotor shaft and having a bearing receiving formation on one face thereof about the disk aperture for receiving a second rotor shaft bearing, a plurality of posts spaced radially between the last said formation and the edge of said disk, said posts being circularly spaced from each other and extending perpendicularly from the rear side of said disk to said stator core, each post being rabbeted to provide an arcuate surface co-axial to the second said bearing receiving formation and in inner shoulder surface corresponding respectively to the arcuate surface and end face surface portions on the second end of said core whereby the second frame member may be fitted thereto; said rotor having the shaft thereof journalled by bearings in said bearing receiving formations; and frame bolts extending through said lugs exteriorly of said core and into corresponding apertures in said disk for holding the frame members on the stator core.

9. An electric motor as described in claim 8, wherein the outer surface of said bridge portion adjacent said bearing receiving formation therein is provided with integral bearing cooling fins.

10. An electric motor as described in claim 8 having a commutating rotor and brushes mounted on the first said frame member, and wherein the apertures of said lugs are arcuate slots co-axial with said rabbeted rim, whereby the brush positions relative to the stator core may be simultaneously adjusted by loosening the said frame bolts and rotationally setting the position of said first frame end member.

11. An electric motor as described in claim 10, wherein cooperating means are provided on said stator core and carried on said second frame member, whereby rotation of the core relative to the second frame member is prevented during rotational adjustment of the brush position.

12. An electric motor as described in claim 8, wherein said disk is provided with integral mounting bolt engaging formations whereby said second frame member is adapted to serve as a base in mounting the motor in the environment of use.

13. In an electric motor-fan unit having a stator core carrying at one end thereof an end frame member for supporting a rotor shaft bearing, frame clamping bolts extending lengthwise of the stator core from the assembly of said end member and stator core, a second frame end member secured to the other end of said core and supporting a second rotor bearing, cylindrical fan housing means mounted to said second member, and a rotor with shaft extending through said second frame end member and mounting fan impeller means within said housing, said shaft having bearings supported by said end members: the combination with the said stator core having the said other end thereof formed to provide end face and external arcuate surface portions respectively perpendicular and co-axial to the axis of the core, of the said second frame end member comprising as an integral structure a disk centrally apertured to receive therethrough said rotor shaft, the forward face of the disk forming an end baffle plate in said fan housing, a bearing socket formation on the rear face of said disk about the aperture thereof for receiving a rotor shaft bearing, a plurality of posts spaced radially between said socket and the edge of said disk, said posts being circularly spaced from each other and extending outwardly from the rear side of said disk to said stator core, each post being rabbeted to provide an arcuate surface co-axial to the said bearing socket and an inner shoulder surface corresponding respectively to the said arcuate and end face surface portions on the said second end of said core whereby the second frame member may be fitted thereto, frame bolt engaging formations on the rear face of said disk, a plurality of spaced guide vanes perpendicular to the rear face of said disk extending outward obliquely relative to disk radii beyond the edge of said disk, and a cylindrical rim portion for mounting said fan housing means, said rim portion being supported by said vanes in co-axial spaced relation to said disk to provide air flow space between the rim, periphery of the disk and said vanes, whereby air exhausting from said fan housing is directed lengthwise of said core exterior thereto and internally between said core and said rotor for motor cooling.

14. For an electric motor-fan unit as described in claim 13, a cast metal second end frame member having cast in the forward face of said disk a circular groove concentric with the aperture of the disk with inner periphery of the groove of cylindrical form, whereby the frame member may be chucked for machining the said rim portion and outer edge of said disk.

15. In an electric motor-fan unit having a stator core carrying at one end thereof an end frame member for supporting a rotor shaft bearing, frame clamping bolts extending lengthwise of the stator core from the assembly of said end member and stator core, a second frame end member secured to the other end of said core and supporting a second rotor bearing, cylindrical fan housing means mounted to said second member, and a rotor with shaft extending through said second frame end member and mounting fan impeller means within said housing, said shaft having bearings supported by said end members: the said second frame end member comprising as an integral structure a disk centrally apertured to receive therethrough said rotor shaft, the forward face of the disk forming an end baffle plate in said fan housing, a bearing socket formation on the rear face of said disk concentric to the aperture thereof for receiving a rotor shaft bearing, a plurality of posts spaced radially between said socket and the edge of said disk, said posts being circularly spaced from each other and extending outwardly from the rear side of said disk to said stator core, said posts including end formations adapted to engage the outer edge of the stator core end laterally and endwise whereby the second frame member may be fitted to said core with the bearing socket in co-axial relation thereto, frame bolt anchoring formations on the rear face of said disk, a plurality of spaced guide vanes perpendicular to the rear face of said disk extending outward obliquely relative to disk radii beyond the edge of said disk, and a cylindrical rim portion for mounting said fan housing means, said rim portion being supported by said vanes in co-axial spaced relation to said disk to provide air flow space between the rim, periphery of the disk and said vanes, whereby air exhausting from said fan housing is directed lengthwise of said core exterior thereto and internally between said core and said rotor for motor cooling.

16. In an electric motor-fan unit having a stator core carrying at one end thereof a frame end structure for supporting a rotor shaft bearing, frame clamping bolts extending lengthwise of the stator core from the assembly of said end member and stator core, a second frame end member secured to the other end of said core and supporting a second rotor bearing, cylindrical fan housing means mounted to said second member on the side opposite the core, and a rotor with shaft extending through said second frame end member and mounting fan impeller means within said housing, said shaft having bearings supported by said end members: the said second frame end member comprising as an integral structure a disk provided with a central aperture and concentric cylindrical bearing receiving formation to receive therethrough said rotor shaft and to receive a rotor shaft bearing, the forward face of the disk forming an end baffle plate in said fan housing, a plurality of posts spaced radially between said bearing receiving formation and the edge of said disk, said posts being circularly spaced from each other and extending outwardly from the rear side of said disk to said stator core, said posts including end formations adapted to engage the outer edge of the stator core end laterally and endwise whereby the second frame member may be fitted to said core with the bearing receiving formation in co-axial relation thereto, frame bolt engaging formations on the rear face of said disk, air guide means at the rear of said disk including a plurality of spaced guide vanes extending outward beyond the edge of said disk, and a cylindrical rim portion for mounting said fan housing means, said rim portion being supported by said vanes in co-axial spaced relation to said disk to provide air flow space between the rim, periphery of the disk and said vanes, whereby air exhausting from said fan housing is directed lengthwise of said core exterior thereto and internally between said core and said rotor for motor cooling.

17. In combination with a second frame member as described in claim 16, a cylindrical cap member having one end mounted on the rear portion of the said rim portion of the second frame member and having on the other end an inward radial flange extending toward and spaced from the said stator core to provide an air outlet peripheral to the exterior of the stator core.

18. An electric motor comprising a commutating rotor; a stator core wherein the rotor is disposed and having the ends thereof formed to provide end face surfaces perpendicular to and external arcuate surface portions co-axial to a common axis of the rotor and core; a first frame end member having an annular body portion including a plurality of spaced radially projecting lugs and having an integral bridge portion across said annular body portion, the annular body portion having an internally rabbeted rim providing a cylindrical surface and a circular shoulder surface inward thereof corresponding respectively to the arcuate surface and end face surface portions at one end of the core whereby the said frame end member is fitted to said core, said lugs being arcuately slotted co-axially to said rabbeted rim, said bridge portion having formed therein an inwardly open rotor shaft bearing receiving formation co-axial with said cylindrical surface; a plurality of brush holder units mounted on the first frame member; a second end frame member provided with a central shaft aperture and concentric cylindrical bearing receiving formation for locating a second rotor shaft bearing and having frame bolt engaging formations, said second end frame member also having integral spacing means extending to the outer edge of the other end of said stator core for spacing the bearing receiving formation therefrom, said spacing means being rabbeted to provide an arcuate surface co-axial to the second said bearing receiving formation and an inner shoulder surface corresponding respectively to the arcuate surface and end face surface on the second end of said core whereby the second frame member may be fitted thereto; said rotor having the shaft thereof journalled by bearings in said bearing receiving formations; and frame bolts for holding the end frame member on the stator core, said bolts extending through said lugs exteriorly of said core and into engagement with said bolt engaging formations, whereby the brush positions relative to the stator core may be simultaneously adjusted by loosening the said frame bolts and rotationally setting the position of the first frame member.

References Cited in the file of this patent

UNITED STATES PATENTS

| | | |
|---|---|---|
| 2,328,038 | Taylor | Aug. 31, 1943 |
| 2,531,342 | Metz | Nov. 21, 1950 |